May 30, 1967  J. ALLEAUME  3,321,881
FOLDED CORRUGATED SHEET-LIKE CORNER PIECE
Filed June 16, 1964  2 Sheets-Sheet 1

Inventor:
Jean Alleaume
By: Nolte & Nolte
Attorneys

May 30, 1967  J. ALLEAUME  3,321,881
FOLDED CORRUGATED SHEET-LIKE CORNER PIECE
Filed June 16, 1964  2 Sheets-Sheet 2

Inventor:
Jean Alleaume
By: Nolte & Nolte
Attorneys

United States Patent Office 3,321,881
Patented May 30, 1967

3,321,881
FOLDED CORRUGATED SHEET-LIKE CORNER PIECE
Jean Alleaume, Saint-Cloud, France, assignor to Technigaz, Paris, France, a corporation of France
Filed June 16, 1964, Ser. No. 375,534
Claims priority, application France, Aug. 16, 1963, 944,844
3 Claims. (Cl. 52—276)

This invention relates essentially to devices constituting corner pieces obtained by folding sheet-metal stock, and also to the various structures obtained therefrom.

The construction of fluid-tight enclosures from a flexible diaphragm consisting of corrugated metal sheets such as the enclosures or casings described for example in copending patent application Ser. No. 374,042 filed June 10, 1964, now Patent No. 3,299,598, require the provision, in the dihedrons connecting two adjacent walls thereof, of special corner pieces having a flexibility at least equal to that of the sheet-metal elements constituting the walls.

These corner pieces may be obtained by welding the edge constituting the intersection of two faces of the dihedron to be formed. However, it may be advantageous, notably with a view to simplify the manufacturing process and increase the final flexibility of these pieces, to avoid this assembling welding step by forming through successive folding operations a non-composite corner piece. This is actually the primary object of the present invention which teaches how corrugated sheets or plates having constant-contour corrugations or waves can be folded along a dihedral angle within the range of 0 to $\pi$ radians, in order to close the corner pieces required for connecting two adjacent walls made from corrugated sheet-metal stock of same cross-sectional configuration.

The folding steps required to form a selected dihedral angle comprised in particular between 60° inclusive and 180° inclusive are carried out in such a way that eventually no material projects from the outer surface of the dihedron.

Other characteristic features of these corner pieces are inter alia the fact that they provide a non-varying dihedral angle in spite of temperature variations and that in the connecting zone these pieces preserve the elasticity necessary for absorbing the effects due to these temperature variations.

Thus, the corner pieces according to this invention are such that the dihedral angle constituted thereby remains constant when the opening of the waves formed on their two faces varies as a consequence of said temperature variations; thus, the flexibility of these pieces remains at least equal to that of the sheet-metal elements constituting the walls to which they are connected.

This invention is also concerned wtih the various applications of the corner pieces broadly defined hereinabove, such as the connections between flexible sheet-metal corrugated walls as used for constructing enclosures or casings impervious to gaseous and liquid media, in all cases where such enclosures or the like are subjected to considerable thermal variations.

Other features and advantages of this invention will appear as the following description proceeds with reference to the accompanying drawings illustrating diagrammatically by way of example a typical form of embodiment of the invention. In the drawings:

FIGURE 3 is a perspective view of the preceding piece in case the wave opening is substantially zero with some of the edges merging into each other.

Figure 1:
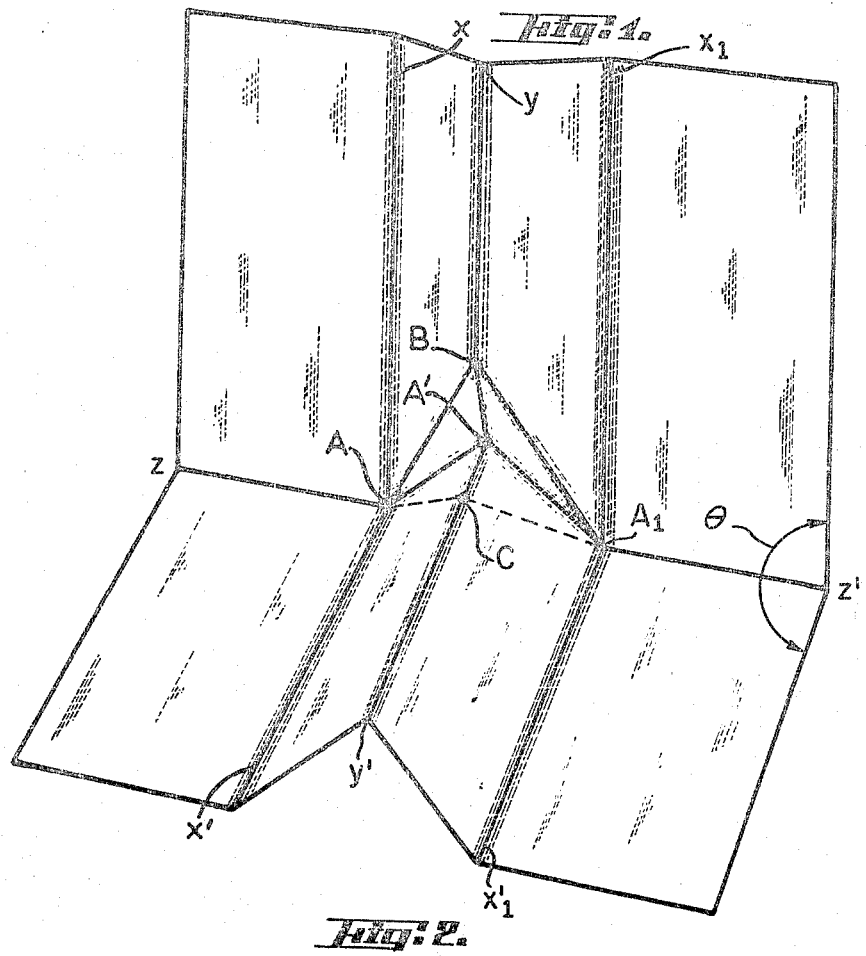
FIGURE 1 is a perspective view showing a corner piece obtained by means of successive folding steps only.

Considering for example the case wherein it is desired to interconnect two corrugated sheet-metal elements having a constant-contour wave form, these two elements forming together a dihedral angle of a magnitude within the range of from 60° inclusive to 180° inclusive radians, with the crest of the resulting dihedron extending at right angles to the wave system, this corner piece may be formed as follows (see FIGURE 1).

The sheet-metal stock, in addition to the folding operation producing the corrugations proper (along the axis $xx'$) is folded twice in the portion where the wave is formed, along two lines ABC and AA'C, and also another time along the edge $zz'$ of the dihedron to be obtained.

The corner piece is folded along the following lines:

(1) Inwards or concave folds forming the edges of re-entrant dihedral surface portions:

$xAx'$ and $x_1A_1x'_1$
$zA$, $AA'$, $A'A_1$ and $A_1z'$
$BA'$ (2) Outwards or convex folds forming the edges of salient dihedral surface portions:

$yB$ and $A'Cy'$
$AB$ and $BA_1$

When folded, the raised wave portion of the corrugation in the upper part of the corner piece extends along the line $yB$, the two bases of this wave extending along the lines $xA$ and $xA_1$. From the point B, the crest or ridge divides, two sections falling down and away one from another along the line BA and $BA_1$, respectively. Thus, at A and $A_1$, the two portions of the wave meet the bases of the wave. In the raised wave portion of the corrugation on the lower part of the corner piece, the crest or ridge extends along the line $y'A'$, the two bases of this wave extending along the lines $x'A$ and $x'_1A_1$, respectively. The two triangular zones bounded by the lines $AA'B$ and $A_1A'B$ together with the two triangular zones $A'AC$ and $A'A_1C$ form the enclosed parts when the wave crest is at its greatest height, that is when the sides or lateral faces of the wave are substantially at right angles to the plane of the sheet material or close to each other, as shown in FIGURE 3. Under these conditions, these four zones are wholly hidden within the folded sheet metal elements, no part of the folded areas projecting outside of the planes of the two elements forming the dihedral angle. In the case shown on FIGURE 3, the lines AB and $A_1B$ merge and the point C is located on this line. The point $A'$ is located on the two converged lines $Ax$ and $A_1x_1$, the crest of the lower element being shown dotted beyond the point C, as it is concealed by the wave of the upper part of the corner piece.

The angles thus formed during these various folding steps should have such values that in case of temperature variations capable of altering the height of the wave system proper no material will project externally of this dihedron, that is toward the side of the dihedron faces which is opposite to the raised waves therein, inasmuch as such projection would be out of question in case the flexible enclosure thus obtained were caused to bear against a resistant supporting structure.

The values of these angles of said triangular zones have predetermined relationships with one another; these relationships are determined by studying the specific case in which the wave opening is zero, so that the edge $AA'$ is exactly coincident with the edge $Ax$ (FIGURE 3).

The dihedral angle $\theta$ of the dihedron formed by the corner piece is equal to the sum of angles $$\widehat{xAB} \text{ and } \widehat{BAx'}$$

bounded by edge AB.

Figure 2:
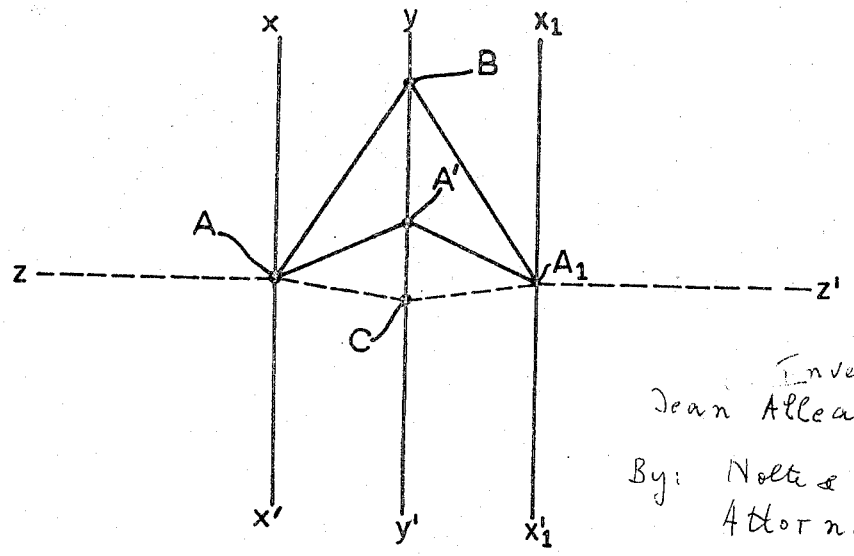
FIGURE 2 is a view showing the angles of the preceding piece which are folded on the plane of the sheet-metal element.
Figure 2:
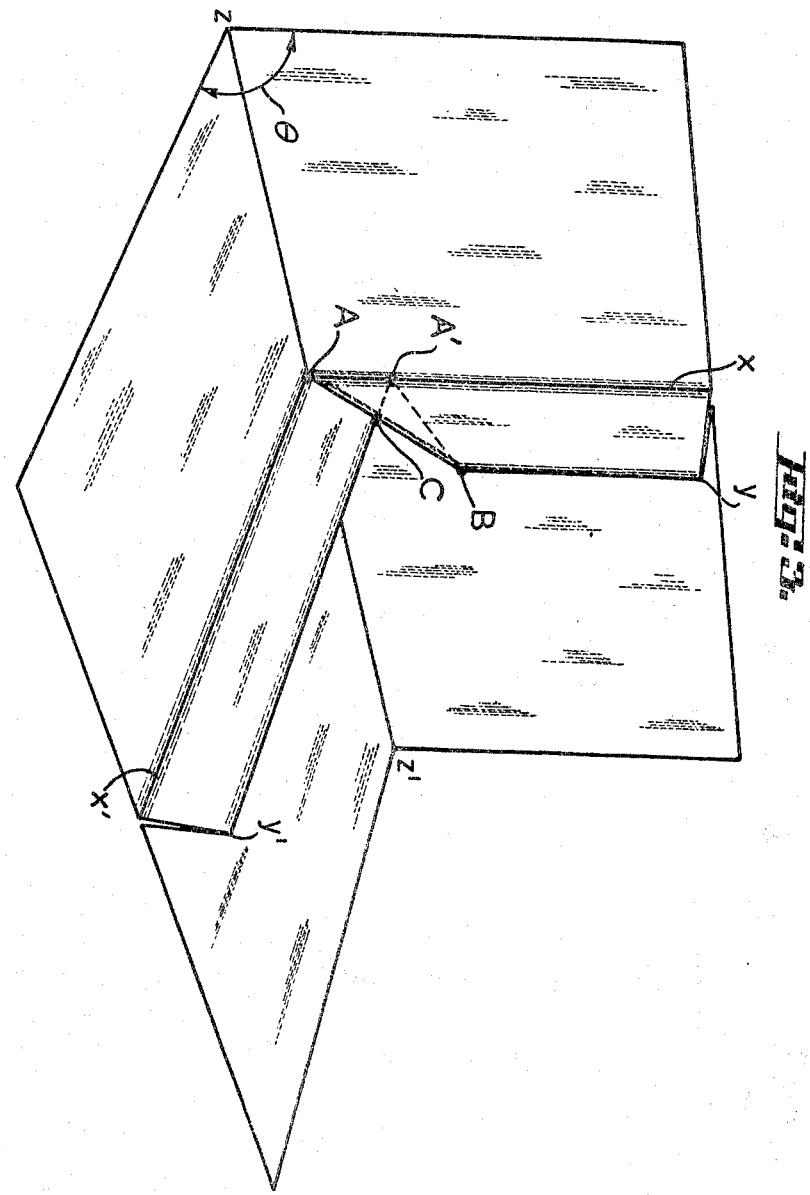

FIGURE 2 shows these different angles on the plane of the sheet-metal element.

Since AA' is coincident with A$x$, and AB is coincident with AC, thus one may write:

$$\widehat{xAB} = \widehat{BAA'} = \widehat{A'AC}$$

$$\widehat{xAB} + \widehat{BAA'} + \widehat{A'AC} + \widehat{CAx'} = \pi$$

$$\widehat{xAB} + \widehat{CAx'} = \theta$$

This system of equations permits of determining $$\widehat{xAB} \text{ and } \widehat{BAA'}$$

when $\theta$ is preselected. In effect, the first equation may be written in the following form in view of the preceding double equality:

$$3\widehat{xAB} + \widehat{CAx'} = \pi \equiv 180°$$

and since $$\widehat{xAx'} = \widehat{xAB} + \widehat{CAx'} \equiv \sigma$$

it results therefrom upon eliminating $\widehat{CAx'}$ by subtracting the last equation from the last but one:

$$2\widehat{xAB} = 180° - \sigma$$

hence $$\widehat{xAB} = \widehat{BAA'} = 90° - \frac{\theta}{2}$$

In any case, the following double inequality must be complied with according to FIGURE 3:

$$0 \leq \widehat{xAB} \leq \sigma$$

or in view of the last equation hereinabove $$0 \leq 90° - \frac{\sigma}{2} \leq \sigma$$

hence $$60° \leq \theta \leq 180°$$

Therefore, the dihedral angle of the corner piece must be in the range from 60° inclusive to 180° inclusive so that no sheet material projects from the outside lateral faces of the dihedron.

Thus, for example assuming that $$\theta = \frac{\pi}{2}$$

one should take $$\widehat{xAB} = \widehat{BAA'} = \frac{\pi}{4}$$

When a corner piece of which the various elements meet the above requirements is formed it will be observed, by varying the opening of the wave about a mean value, that the dihedral angle thus obtained remains constant and that no sheet material can project externally of the dihedron.

Of course, this invention should not be construed as being limited by the specific form of embodiment described and illustrated herein by way of example, since many modifications may be brought thereto without departing from the principle of the invention as set forth in the appended claims.

What I claim is:

1. A corner piece forming a folded angular member of corrugated sheet metal stock for connecting together, at any substantially dihedral angle between 0° and 180°, two adjacent similarly corrugated sheet-like plate elements having at least one set of substantially parallel spaced corrugations extending at least endwise substantially at right angles to the edge of said dihedral angle and projecting from a same side of said elements which is the inside of said dihedral angle, said corner piece being formed with at least one set of at least one integral channel-like corrugation, each one of which has a raised substantially dihedral wave portion of substantially uniform cross-sectional contour extending substantially at right angles to the edge of said dihedral angle and projecting from the inner side thereof and adjacent, along its length, to a pair of substantially flat, smooth, uncorrugated areas located on both sides of said wave portion, respectively in substantially the same plane, whereby said corner piece is folded on the one hand along at least one set of three spaced lines substantially straight and parallel to the corrugations of said elements to define a salient dihedral surface portion forming said wave portion, thereby provided with a convex fold crest line and two concave fold base lines as viewed from the inside of said dihedral angle, on the other hand along one concave fold line substantially at right angles to the first-named lines to form a dihedron having said dihedral angle, thereby dividing said wave portion into two parts pertaining to the two lateral faces, respectively, of said dihedral angle, and further along four lines from the respective neighbouring ends of the crests of said wave parts, two on either side of the latter, each one of the pairs of said lines converging to a point where the base lines of said wave parts meet the edge fold line of said dihedral angle, so that the crest line of one wave part divides from its end into two sections falling down and away from one another along two convex folding lines and the crest line of the other wave part divides from its end into two concave folding lines falling down and away from one another, both of said ends being joined by a concave folding line, whereby said other wave part extends endwise into said one wave part to define an intersecting region forming a substantially tetrahedral re-entrant angle as viewed from the inside of said dihedral angle.

2. A corner piece according to claim 1, wherein each corrugation is substantially symmetrical with respect to the plane passing through the crest line thereof and substantially perpendicular to the edge of said dihedral angle, said dihedral angle being substantially equal to the sum of on the one hand, the angle bounded by one base line and one of said convex folding lines of said one wave part and on the other hand the angle bounded by one base line of said other wave part and said one convex fold line when the angle between the two lateral faces of each wave part is zero.

3. A corner piece according to claim 2, wherein said dihedral angle is in the range of from 60° inclusive to 180° inclusive, so that the end of the crest line of the other wave part, forming the vertex of said tetrahedral angle, reaches at most a point lying in the same plane as the base lines of said one wave part when the angle between the two lateral faces of each wave part is zero, so that no material projects from said plane toward the outside of said dihedral angle.

References Cited

UNITED STATES PATENTS 3,118,523  1/1964  Girot _____ 52—573

FOREIGN PATENTS 174,025  3/1953  Sweden.

DAVID J. WILLIAMOWSKY, *Primary Examiner.*

HARRISON R. MOSELEY, KENNETH DOWNEY,
*Examiners.*

A. I. BREIER, *Assistant Examiner.*